UNITED STATES PATENT OFFICE.

RUDOLF RUSS, OF RUMBURG, AUSTRIA-HUNGARY, ASSIGNOR OF ONE-HALF TO THE FIRM OF STOLLE & KOPKE, OF RUMBURG, AUSTRIA-HUNGARY.

METHOD OF OBTAINING SULFONATED OILS AND FATS.

1,081,775.     Specification of Letters Patent.     Patented Dec. 16, 1913.

No Drawing.     Application filed May 8, 1913. Serial No. 766,432.

*To all whom it may concern:*

Be it known that I, RUDOLF RUSS, subject of the Emperor of Austria-Hungary, residing at Rumburg, in the Empire of Austria-Hungary, have invented a certain new and Improved Method of Obtaining Sulfonated Oils and Fats, of which the following is a specification.

This invention relates to the manufacture of sulfonated oils and fats, and more particularly to the method of separating the large excess of free sulfuric acid which results from treating the oils or fats in the known manner with fuming sulfuric acid.

It has hitherto been usual to remove the excess sulfuric acid by stirring the sulfonated oils or fats with water or a salt solution and allowing the same to stand for a considerable time, about 24 to 28 hours, whereupon the excess acid separates out with the wash liquid to such an extent that the two liquids can be readily separated.

According to the present invention the sulfonated oil or fat is separated from the wash liquid in a very rapid and efficient manner, by submitting the mixture to centrifugal action in a centrifugal separator in the manner hitherto usual in milk separators. It has been found that by this method the pure sulfonic oils or fats so obtained differ from those hitherto obtained by the usual washing process in their properties and characteristics and possess valuable properties not or only very slightly present in the sulfonic oils and fats hitherto obtained.

The sulfonic oils and fats obtained by the present method are characterized by their high resistance to the action of acids or of calcium and magnesium salts and their capability of giving clear solutions with either soft or hard water either in neutral or in strongly acid condition.

It is possible to obtain turkey-red oils by the present method having properties which were hitherto only partially obtainable and had to be obtained by more complicated and costly methods without, moreover, attaining and combining the properties hereinbefore referred to.

In carrying out the present method the sulfonated oil or fat is intimately mixed with the requisite quantity of water or a salt solution, for example, in equal quantities, and the mixture is then separated in a centrifugal separator.

I claim:—

1. Method of obtaining sulfonated oils and fats which consists in treating them with sulfuric acid and removing the excess acid by the addition of a wash liquid, and separating the wash liquid and excess acid from the sulfonated oil or fat by submitting the mixture to centrifugal action.

2. Method of obtaining sulfonated oils and fats which consists in treating them with sulfuric acid and removing the excess acid by the addition of water, and separating the water and excess acid from the sulfonated oil or fat by submitting the mixture to centrifugal action.

In testimony whereof I have affixed my signature in presence of two witnesses.

RUDOLF RUSS.

Witnesses:
     FRANZ SIMON,
     ADOLF ALGER.